Oct. 4, 1927.  A. J. DEBRY ET AL  1,644,638
HINGE
Filed Nov. 7, 1924
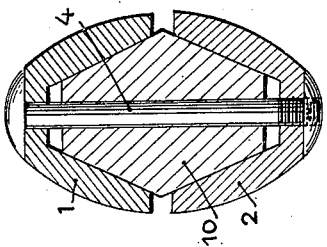
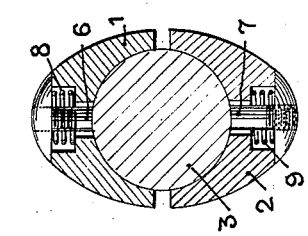
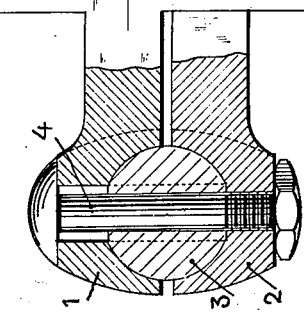
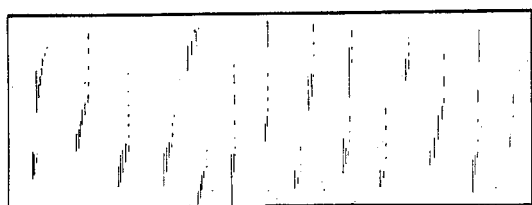
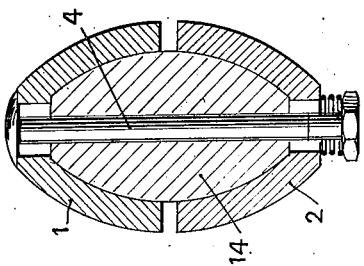
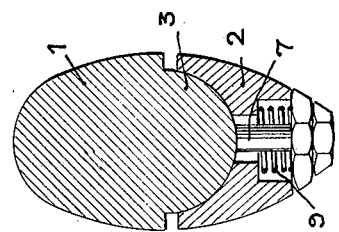
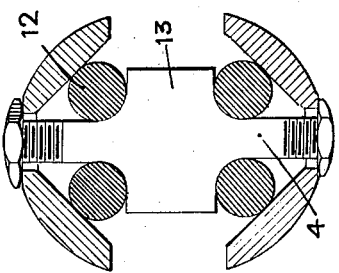
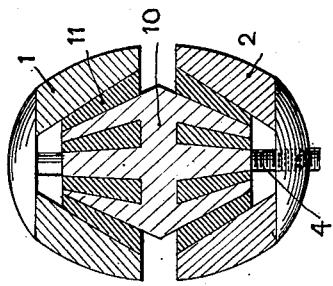
INVENTOR
ANDRÉ J. DEBRY
JEAN A. DEBRY
BY
ATTORNEYS Patented Oct. 4, 1927.

1,644,638

UNITED STATES PATENT OFFICE.

ANDRÉ JOSEPH DEBRY AND JEAN ALFRED DEBRY, OF COURBEVOIE, FRANCE.

HINGE.

Application filed November 7, 1924, Serial No. 748,393, and in France April 15, 1924.

This invention relates to a socket hinge for the doors of vehicles and for other uses.

In existing hinges, the members or hinge parts are assembled by eyes fitting between each other and by a common axle which passes through these members which are fitted together, so that when the rubbing parts wear, which wear is helped for most of the time by the rubbing of iron upon iron, play is produced in the hinge which prevents the door from being properly held and detracts from its good appearance.

The hinge, according to the invention, which overcomes these disadvantages is more particularly characterized by the feature that between the parts of the hinges is interposed a carrying member of spherical, ovoid, conical or other shape, with the interposition if desired of a connecting member, which may be resilient or nonresilient, to ensure the taking up of any play as well as the maintaining of a bearing surface which is practically unvaried.

Various forms of construction of the hinge according to the present invention are shown, by way of example, in the accompanying drawing in which:—

Figure 1 is a first form of construction of a complete hinge;

Figures 2 to 8 are modifications of the eye or joint of the hinge.

In the form of construction of the hinge according to the invention, instead of allowing the two heads 1 and 2, which are attached to the corresponding wings of the hinge, to rest directly upon each other, a bearing member 3 is interposed between these heads, the member 3 being, for example, of spherical shape traversed by the pin 4 of the hinge which may, for example, be a bolt of any suitable shape.

The hinge parts 1, 2 may be made of any suitable substance such as iron or steel which does not easily shear or tear, hemispherical seats being provided inside these heads so as to suitably enclose the bearing member 3 which is preferably constituted by a sphere made of suitable antifriction metal, such as bronze, bronze alloy or any other suitable material. The pin bolt 4 will pass preferably with a suitable amount of play, either through the two heads 1, 2 of the hinge, or through only one of these heads and the pin bolt 4 will preferably also pass through the part 3 with a certain amount of play, as indicated in Fig. 2, a spring 5 being prefer- ably also interposed between one end of the bolt 4 and the corresponding hinge head 2 so as to ensure the various parts being assembled resiliently and to compensate automatically for wear thus obviating any play.

With this arrangement the hinge heads 1, 2 are centered automatically on the bearing member 3, the pivoting axle of the hinge being no longer formed by the bolt 4 which connects the heads 1, 2 together, contrary to the practice in the case of existing hinges, so that these parts of the hinge may pivot correctly in spite of the possible dropping of these parts.

It is seen from these arrangements that the iron work of the doors of vehicles and more particularly of motor vehicles need not be made with so much precision each of the hinges provided for the support of the door being regulated automatically so as to make its particular axis of oscillation correspond with the axis of rotation of the door whatever be the relative position of the two parts of each hinge.

The bearing member will be preferably made of spherical shape, so as to ensure a correct operation of the doors in spite of possible defects in the mounting. This supporting piece may also have the shape shown in Figure 3, being attached to pins 6, 7 with springs 8, 9, or be attached to one of the heads, for example 1, as shown in Figure 7.

However, in certain cases, instead of cylindrical bearing surface use may be made of a bearing member 10 formed by two frustra of cones as shown in Figure 4, with friction rollers 11 interposed if desired (Fig. 5).

The bearing surface may also be obtained by means of balls 12 (Fig. 6) supported in a ball race 13 attached to the pin 4.

Use may be also made, as shown in Figure 8, of a bearing member 14 of ovoid shape.

The bearing of the parts of the hinges may be made smoother, by arranging balls for example, between the bearing surface and the heads 1, 2.

The hinge may have any desired external shape and any dimensions suited for the use to which it is to be put. The hinges may be mounted in any desired number on a door, the arrangement of the pin 4 in the shape of a bolt enables the hinge to be easily taken to pieces and thus simplifies the taking down of the door for repairs, visits, etc., as well as for the replacing of parts such as the sphere, spring, etc., which are worn or rendered unfit for use for any reason whatever.

The invention may also be applied to the doors of motor vehicles or others, for all doors in general whatever be their use, and more particularly in all cases where any two members are to be mounted with reference to each other in such a manner as to be pivotal.

What we claim is:

1. A hinge, comprising two knuckle members each having a socket in its inner face, a spherical bearing member between the knuckle members in the sockets thereof, and means for resiliently securing the knuckle members together upon the bearing member.

2. A hinge comprising two knuckle members each having a socket in its inner face, a spherical bearing member carried by said members, and means for resiliently securing the bearing member to the knuckles and the knuckles together.

3. A hinge comprising two knuckle members each having a socket in its inner face and an opening leading from the socket out through the said member, a spherical bearing member in the sockets of the knuckle members, means for securing the knuckle members together and on the bearing member, said means projecting from the bearing member into the openings of the knuckle members and secured therein, and spring means for yieldingly holding the knuckle members in engagement with the bearing member.

4. A hinge, comprising two knuckle members each having a semispherical socket in its face and an opening leading from the socket and through the members, a spherical bearing member in the socket of the knuckle members and provided with an opening extending therethrough, a bolt extending through the knuckle members and bearing member, and a spring on one end of the bolt and in the openings of the knuckle members.

ANDRÉ JOSEPH DEBRY.
JEAN ALFRED DEBRY.